United States Patent [19]

Johnson

[11] Patent Number: 4,491,233

[45] Date of Patent: Jan. 1, 1985

[54] STACKABLE FOOD SERVICE CARRIER

[76] Inventor: Kendrick A. Johnson, 8242 Queen Ave. South, Bloomington, Minn. 55431

[21] Appl. No.: 460,764

[22] Filed: Jan. 25, 1983

[51] Int. Cl.³ .................................. B65D 21/02
[52] U.S. Cl. .......................... 220/23.83; 206/509; 206/563
[58] Field of Search ............ 220/23.83; 206/509, 206/512, 563, 511

[56] References Cited

U.S. PATENT DOCUMENTS

| Re. 30,962 | 6/1982 | Bridges. | |
|---|---|---|---|
| 1,739,895 | 12/1929 | Gamble. | |
| 2,210,521 | 8/1940 | Bemis | 220/23.83 |
| 2,235,700 | 3/1941 | Hearn et al. | |
| 2,302,446 | 11/1942 | Kincaid. | |
| 2,351,051 | 6/1944 | Kenigson. | |
| 2,652,702 | 9/1953 | Hintze. | |
| 2,662,382 | 12/1953 | Potchen. | |
| 3,025,948 | 3/1962 | Appelt | 206/563 X |
| 3,122,265 | 2/1964 | Innis. | |
| 3,181,288 | 4/1965 | McCowan. | |
| 3,305,126 | 2/1967 | Cease | 220/23.83 |
| 3,407,961 | 10/1968 | Box | 206/512 X |
| 3,532,247 | 10/1970 | Bridges | 206/509 X |
| 3,642,165 | 2/1972 | von der Osten | 220/23.83 |
| 3,754,640 | 8/1973 | Bridges. | |

OTHER PUBLICATIONS

Brochure, "Centry I, Two Piece Insulated Meal Server", No. SS 1065, Dec. 1981, by Aladdin Synergetics, Inc., Nashville, TN 37210.

Primary Examiner—Steven M. Pollard
Attorney, Agent, or Firm—Merchant, Gould, Smith, Edell, Welter & Schmidt

[57] ABSTRACT

The present carrier structure includes a first member in the form of a plurality of stackable trays and second members in the form of heat retaining food covers. The food covers are held in place between adjacent stacked carriers.

10 Claims, 5 Drawing Figures

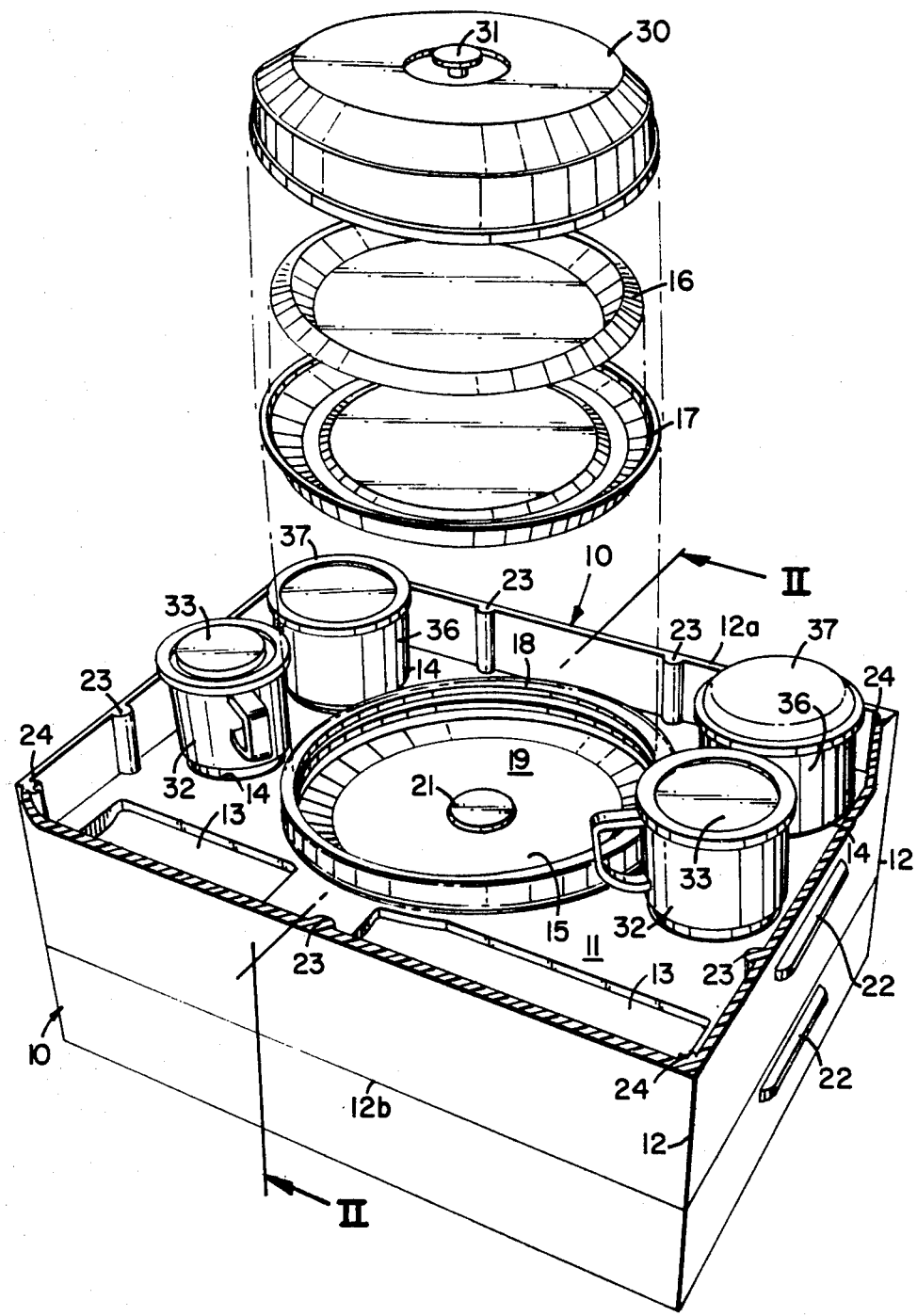
FIG. I

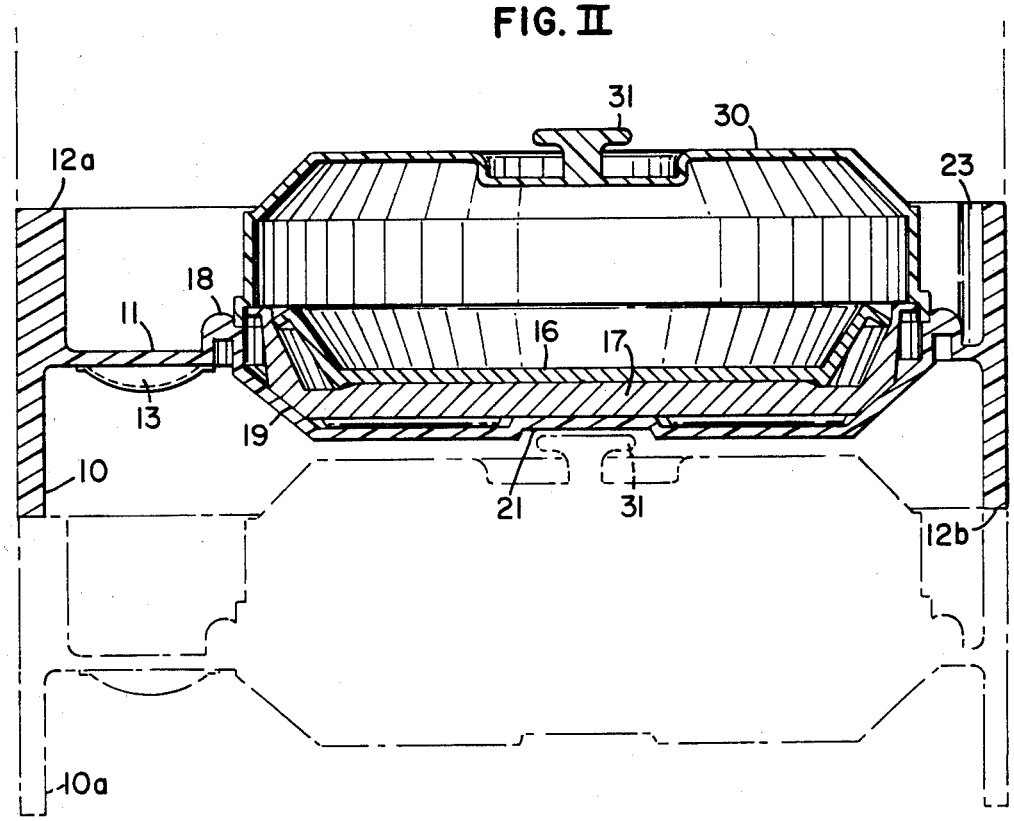
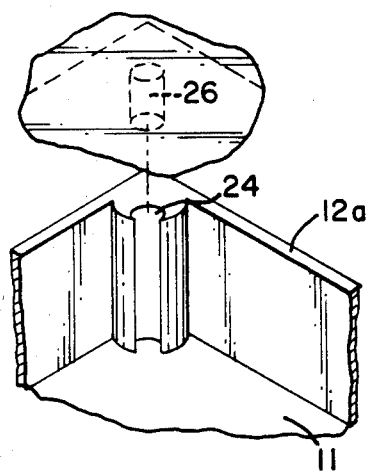

FIG. IV
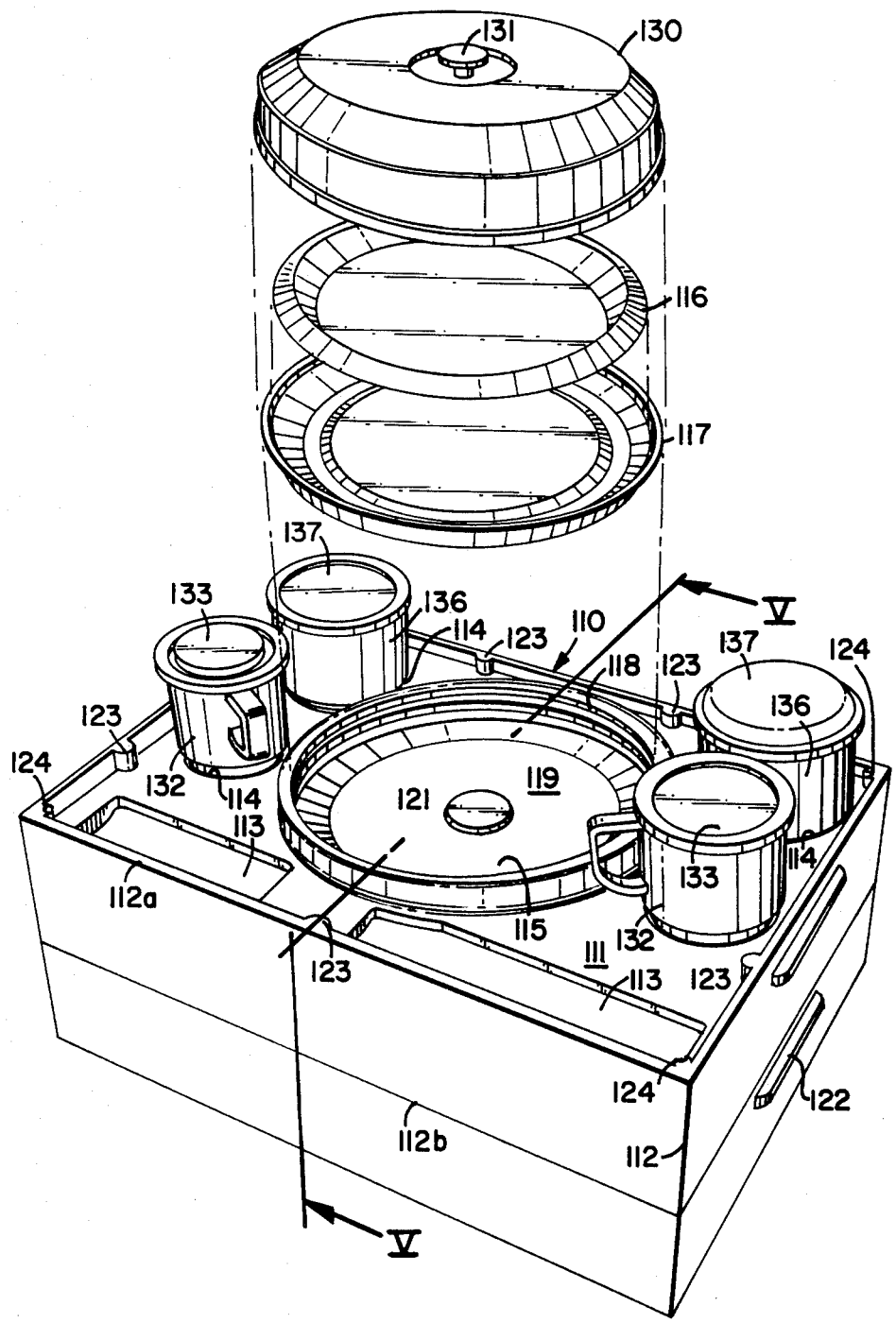

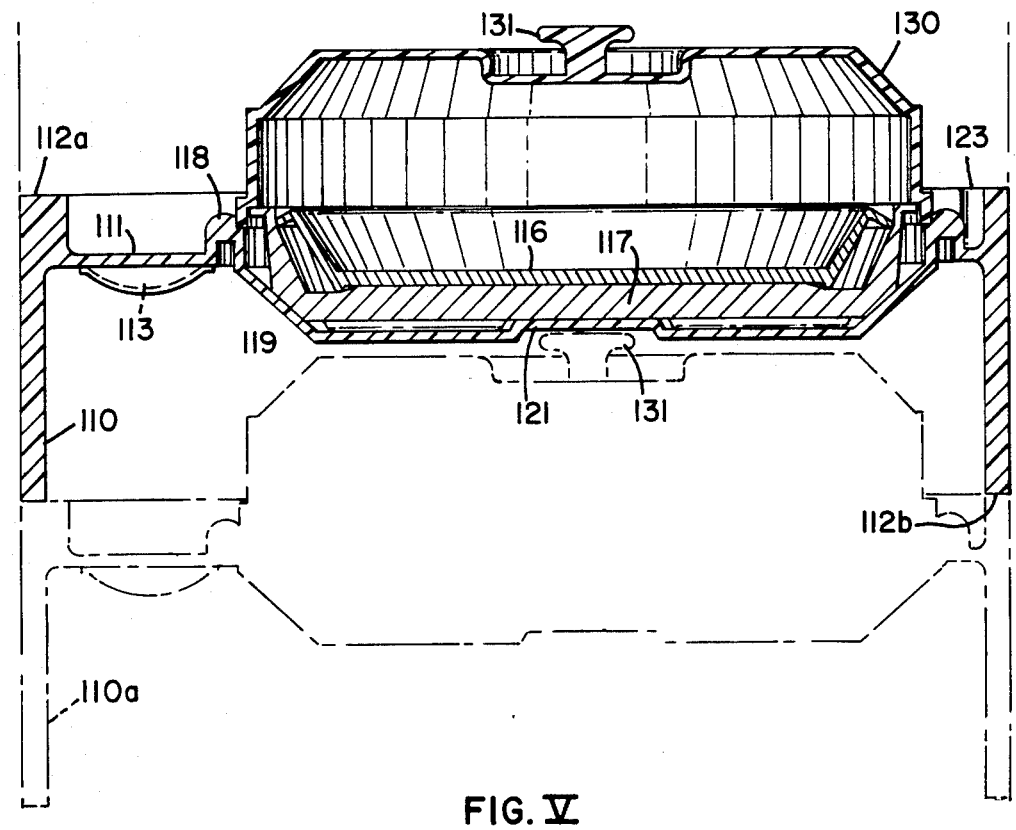
FIG. V

STACKABLE FOOD SERVICE CARRIER

BACKGROUND OF THE INVENTION

The present invention relates to trays for serving food, and more particularly to food serving trays for short term storage of food in zones of elevated temperature and zones of reduced temperature.

Mass serving of food requires storage of hot food materials, e.g. meat and cooked vegetables, as well as food of reduced temperature, e.g. ice cream, butter and the like. The requirement for temperature differential between the various food materials has created many difficulties in the past. One method for dealing with the problem has been to serve first the hot food materials and subsequently serve the low temperature foods. It is desirable, of course, to minimize the serving steps by providing both the hot food as well as the cold food in the same food storage tray.

Illustrative food serving trays providing zones for maintaining temperature differential between various food materials are U.S. Pat. No. 3,122,265 (Innis), U.S. Pat. RE. No. 30,962 (Bridges) and U.S. Pat. No. 3,754,640 (Bridges). Such patents disclose the concept of a heat insulating tray having a plurality of zones, each of which is adapted for receipt of a food container such as a plate, cup saucer or the like. The trays disclosed in such prior patents are stackable and the lower surface of one tray mates with the upper surface of the next lower tray, thus providing for enclosure of the various temperature zones. Such trays serve adequately to maintain the desired temperature differentials so long as the trays are maintained in a stacked relationship. However, once the trays are separated, the hot food, for example, may quickly cool and become less than satisfactory to the palate.

The present invention overcomes such problem by providing a first tray member suitable for stacking one upon another. The present invention further includes a second member which serves to close a zone containing food at elevated temperatures. The second member is adapted to lockingly engage the tray upon which it rests as well as engaging the tray next above so long as the trays are in the stacked position. The second member serves to maintain the elevated temperature of the hot food until the person receiving the food removes the cover.

BRIEF DESCRIPTION OF THE DRAWINGS

FIG. 1 is an exploded view of a plurality of trays according to the present invention;

FIG. 2 is a cross-sectional view taken along the lines 2—2 in FIG. 1;

FIG. 3 is an enlarged portion of the tray of FIG. 1;

FIG. 4 is an exploded view of an alternate embodiment of the present invention; and FIG. 5 is a cross-sectional view of the alternate embodiment of FIG. 4 taken along the line 5—5 in FIG. 4.

DETAILED DESCRIPTION OF THE PRESENT INVENTION

The tray 10 of the present invention as seen in FIGS. 1-3 includes a planar portion 11 and an integral vertical wall 12. The wall 12 extends around the entire periphery of planar portion 11 thereby enclosing portion 11 on all sides. The planar portion 11 may have a plurality of recesses such as 13, 14 and 15. The recess 13, for example, may be suitably sized to receive eating implements such as knives, forks, spoons and the like. Other recesses such as 14 may be suitably sized and shaped to receive a cup or bowl containing a beverage, e.g. milk or orange juice. Recess 15 may be suitably sized to receive a dinner plate, or as illustrated in FIG. 1, a dinner plate 16 in combination with a metal heat retainer 17. The metal heat retainers are known in the art and are used for purposes of insuring that the food does not cool before the person being served has had an opportunity to consume the food. The recess 15 has a ridge 18 defined about the upper rim thereof for purposes hereinafter described. As can be seen in FIG. 1 and also in FIG. 2, the lower portion 19 has a downwardly facing cavity 21 for purposes hereinafter described.

The vertical wall portion 12 may have a pair of handles or grips 22, one of such grips being disposed at each end of the tray to assist in handling of the tray. The vertical wall 12 further may include a plurality of strengthening ribs 23 thereby permitting reduction of the thickness of the wall 12. The wall 12 may include a socket 24 at each corner, as well as a corresponding downwardly extending pin 26. The pins 26 and the sockets 24 cooperate between adjacent trays to provide for locking of the trays with respect to one another. Thus a tray 10 does not slide sidewardly with respect to the adjacent tray 10a.

The present tray further includes a cooperating cover member 30 adapted for mounting over the recess 15 and in locking engagement therewith. The cover 30, as shown in FIG. 2, rests within the ridge 18. Thus, cover 30 remains in place during handling. The cover 30 has an upwardly extending handle 31 by which one may grasp the cover 30 to remove the cover. The cover is further held in place by engagement of the handle 31 in the downwardly opening cavity 21. The cover 30 is sized such that the handle 31 snugly engages and supports the planar portion 11 of the next higher tray. This permits adequate support for the metal heat retainer 17, the plate 16, as well as the food materials contained on plate 16 without permitting downward flexing of the planar portion 11. This provides a much stronger tray and one less susceptible to damage.

FIG. 3 illustrates the pin and socket cooperation of adjacent trays. The pin 26 slides downwardly into the socket 24 thereby locking the trays from horizontal movement with respect to one another. Of course the pin and socket may be reversed.

In the tray 10, the planar portion 11 is disposed equally spaced from the upper edge 12a and the lower edge 12b af side walls 12.

Although use of the present invention is apparent from the foregoing disclosure, it will be further discussed in order to provide a more complete understanding of the present invention. Institutions such as hospitals, schools and the like, generally cook and prepare all of the food materials in a single kitchen, often separated by some distance from the persons for whom the food is prepared. At the time of dispensing the food, the kitchen personnel place the food on the tray. For example, the cups 32 may be filled with milk and the cover 33 snapped in place. Similarly, ice cream may be placed in the bowl container 36 and the cover 37 snapped in place. The cup 32 and the bowl 34 are placed in the appropriate recesses in tray 10. Silverware may then be placed in recess 13. The metal heat retainer 17 is heated for example in an oven or steam cabinet to an elevated temperature. The heat retainer 17 is then placed in the well 15. A dinner plate 16 is also placed in the well 15 immediately above the metal heat retainer 17. Food, such as meat, potatoes and carrots are placed on the plate 16. The cover 30 is then placed over the dinner plate 16. The cover 30 snugly fits within the ridge 18 as illustrated in FIG. 2, such that the cover 30 is not displaced sidewardly during handling. Once a tray 10 is loaded, a further tray may be placed over tray 10 and filled with food in a similar manner. A plurality of trays may be placed on a cart and then pushed to the location where the food will be consumed. If desired, the various food containers, including the cup 32, the bowl 36, plate 16 and the silverware may be removed from the tray at the time of serving.

An alternate embodiment of the present invention is illustrated in FIGS. 5 and 6. Tray 110 may be similar in structure to tray 10 including a plurality of recesses such as silverware recess 113, cup receiving recess 114 and dinner plate receiving recess 115. The tray 110 may have a pair of handles 122 to facilitate handling of the tray. The recess 115 may be suitably sized as described in regard to tray 10 for reception of a metal heat retainer 117 and a dinner plate 116. Tray 110 further includes a cover 130 which engages in ridge 118. The cover 130 facilitates maintaining an elevated temperature for food contained in dinner plate 116. Tray 110 has a planar portion 111 which is disposed slightly lower than the upper edge 112a of wall 112. Tray structure 110 is designed for holding the food containers throughout the meal. Since the upper edge 112a is slightly above the planar surface 111, any spillage is retained within the tray 110 thus facilitating cleanup of the eating area particularly in cases where patients may have difficulty in handling of food. The cover 130 and tray 110 cooperate in a manner similar to that described with regard to tray 10 such that the cover 130 is held in place by the adjacent tray 110 until the trays are separated, thus minimizing displacement of the cover during movement from the kitchen area to the consuming area and during handling of the trays.

What is claimed is:

1. A carrier adapted for stacking, said carrier comprising a first member and a second member, said first member including a substantially planar portion and a vertical wall portion surrounding said planar portion, said planar portion having an upwardly opening well defined therein for reception of a dinner plate, said well having an upper ridge surrounding said well, said well further including a small downwardly opening cavity; said second member comprising a cover for said well, said second member including a ridge receiving zone for reception of said well upper ridge, said cover further including an upwardly extending handle, said handle being of substantially the same shape as said small downwardly opening cavity, said handle being slightly smaller in size than said cavity.

2. The carrier of claim 1 wherein said well upper ridge and said cover ridge receiving zone are adapted to lock said cover with respect to said tray first member thereby preventing translational movement of said cover with respect to said tray first member.

3. The carrier of claim 1 wherein said vertical wall portion is adapted for stacking engagement with other trays.

4. The carrier of claim 3 wherein said vertical wall portion includes means for locking engagement with adjacent trays during stacking.

5. The carrier of claim 4 wherein said locking means includes pins extending downwardly from the lowermost edge of vertical wall portion.

6. The carrier of claim 5 wherein said locking means further includes means defining an upwardly opening cavity sized for reception of the downwardly extending pins for the adjacent tray during stacking.

7. A stackable carrier system including a plurality of tray members stacked one above another, said tray members each including wall means providing direct engagement between adjacent trays, and means for covering a portion of each of said tray members, one of said covering means being disposed between each adjacent tray member, said tray members each having an upper surface including means for interlocking with one of said covering means, said tray members each having a lower surface including means for engaging one of said covering means.

8. The stackable carrier system of claim 7 wherein said upper surface interlocking means comprise a ridge surrounding said tray portion and wherein said covering means includes a ridge receiving zone for engagement with said ridge.

9. The stackable carrier system of claim 8 wherein said tray members include means for providing locking engagement with adjacent trays during stacking.

10. The stackable carrier system of claim 9 wherein said tray locking means comprise a pin extending from one of said tray members and wherein the adjacent tray member has defined therein an opening for reception of said pin.

* * * * *